(12) United States Patent  
Okada et al.

(10) Patent No.: US 9,383,277 B2  
(45) Date of Patent: Jul. 5, 2016

(54) FORCE SENSOR

(71) Applicant: WACOH CORPORATION, Saitama (JP)

(72) Inventors: Kazuhiro Okada, Saitama (JP); Satoshi Era, Saitama (JP); Miho Okada, Saitama (JP)

(73) Assignee: WACOH CORPORATION, Saitama (JP)

( * ) Notice: Subject to any disclaimer, the term of this patent is extended or adjusted under 35 U.S.C. 154(b) by 244 days.

(21) Appl. No.: 14/368,304

(22) PCT Filed: Jul. 17, 2013

(86) PCT No.: PCT/JP2013/069962  
§ 371 (c)(1),  
(2) Date: Jun. 24, 2014

(87) PCT Pub. No.: WO2015/008393  
PCT Pub. Date: Jan. 22, 2015

(65) Prior Publication Data  
US 2016/0041049 A1 Feb. 11, 2016

(51) Int. Cl.  
*G01L 5/16* (2006.01)  
*G01L 1/26* (2006.01)  
*G01L 1/14* (2006.01)

(52) U.S. Cl.  
CPC ................ *G01L 5/165* (2013.01); *G01L 1/142* (2013.01); *G01L 1/26* (2013.01)

(58) Field of Classification Search  
CPC ............ G01L 5/165; G01L 1/142; G01L 1/26  
USPC ...................... 73/862.626, 862.621  
See application file for complete search history.

(56) References Cited

U.S. PATENT DOCUMENTS 4,089,036 A * 5/1978 Geronime ............. G01L 9/0072  
361/278  
5,421,213 A 6/1995 Okada  
(Continued)

FOREIGN PATENT DOCUMENTS

CN 1479858 A 3/2004  
CN 102980689 A 3/2013  
(Continued)

OTHER PUBLICATIONS

First Office Action dated Nov. 4, 2015 for Chinese Application No. 2013800035235.  
(Continued)

*Primary Examiner* — Freddie Kirkland, III  
(74) *Attorney, Agent, or Firm* — Ladas & Parry LLP

(57) ABSTRACT

A cylindrical annular detector is disposed at the periphery of the columnar body fixed at a central part of the upper surface of a supporting substrate. A space between the columnar body and the annular detector is connected by a thin flexible connection member (diaphragm). A washer-shaped insulation substrate is disposed on the upper surface of the supporting substrate, individual fixed electrodes are formed on the upper surface thereof, and they constitute capacitive elements together with a displacement electrode which is composed of the lower surface of the annular detector. Upon exertion of an external force on the annular detector, the flexible connection member deflects to cause displacement, which is detected as change in capacitance value of the capacitive element.

14 Claims, 6 Drawing Sheets

(56) References Cited

U.S. PATENT DOCUMENTS

| | | | |
|---|---|---|---|
| 5,668,318 A | 9/1997 | Okada | |
| 6,026,694 A * | 2/2000 | Gray | G01G 7/06 73/862.68 |
| 6,530,283 B2 | 3/2003 | Okada | |
| 6,989,677 B2 * | 1/2006 | Morimoto | G06F 3/0338 324/660 |
| 7,673,530 B2 * | 3/2010 | Harish | G01G 7/06 73/780 |
| 7,784,366 B2 * | 8/2010 | Daverman | G01L 1/142 73/780 |
| 8,096,196 B2 * | 1/2012 | Eilersen | G01L 19/04 73/862.041 |
| 8,220,343 B2 * | 7/2012 | Hatanaka | G01L 5/161 73/862.044 |
| 8,350,345 B2 * | 1/2013 | Vaganov | G06F 3/0338 257/415 |
| 8,408,075 B2 * | 4/2013 | Okada | G01L 5/165 73/862.043 |
| 8,667,854 B2 * | 3/2014 | Nishioki | G01L 3/106 73/780 |
| 8,966,996 B2 * | 3/2015 | Okada | G01L 1/14 73/862.041 |
| 2004/0104735 A1 | 6/2004 | Morimoto | |

FOREIGN PATENT DOCUMENTS

| | | |
|---|---|---|
| JP | 64-35331 A | 2/1989 |
| JP | 04-148833 A | 5/1992 |
| JP | 06-174571 A | 6/1994 |
| JP | 08-226931 A | 9/1996 |
| JP | 2001-165790 A | 6/2001 |
| JP | 2002-071705 A | 3/2002 |
| JP | 2004-069405 A | 3/2004 |
| JP | 2009-257992 A | 11/2009 |
| JP | 2010-8343 A | 1/2010 |
| JP | 2010-210558 A | 9/2010 |
| JP | 2011-128096 A | 6/2011 |

OTHER PUBLICATIONS

J-PlatPat English abstract of JP 64-35331 A.
J-PlatPat English translation of JP 2010-210558 A.
J-PlatPat English translation of JP 2011-128096 A.
Espacenet English abstract of CN 102980689 A.

* cited by examiner

FORCE SENSOR

RELATED APPLICATION INFORMATION

This application is a 371 of International Application PCT/JP2013/069962 filed 17 Jul. 2013 Entitled "Force Sensor", the content of which is incorporated herein by reference.

TECHNICAL FIELD

The present invention relates to a force sensor and in particular to a type of force sensor having at a part of a structural body a flexibly deformed portion which deflects by exertion of an external force, thereby electrically detecting displacement caused by deformation of the flexibly deformed portion.

BACKGROUND ART

There has been commercially available a type of force sensor in which an external force is exerted on a diaphragm portion which is made of a flexible thin plate, thereby electrically detecting a deformed state of the diaphragm portion and also detecting a magnitude of the exerted external force and a direction thereof. This type of sensor is relatively simple in structure and can be kept low in production cost, and can be used in many applications in various industries as a mass-produced product.

A method for electrically detecting a deformed state of the diaphragm portion includes a method for utilizing an electrostatic capacitive element, a method for utilizing a piezoresistive element and a method for utilizing a piezoelectric element. Each of these elements is disposed at a plurality of sites to detect displacement of each position at the diaphragm portion as an electrical signal, thus making it possible to detect independently a magnitude of a component of an exerted external force in the direction of each coordinate axis in an XYZ three-dimensional orthogonal coordinate system.

For example, in Patent Documents 1 and 2 given below, there is disclosed a force sensor which is capable of utilizing an electrostatic capacitive element to detect displacement of each site of the diaphragm portion, thereby detecting independently a force exerted in a direction of each coordinate axis. Further, in Patent Documents 3 and 4, there is disclosed a force sensor which detects a force in a direction of each coordinate axis on the basis of change in electric resistance of a piezoresistive element installed at individual sites of the diaphragm portion. In Patent Documents 5 and 6, there is disclosed a multi-axis sensor which detects displacement of each site of a diaphragm portion on the basis of electrical charge occurring at a piezoelectric element, detecting an acceleration-based force exerted as an external force and coriolis force, thereby detecting acceleration in a direction of each coordinate axis and angular speed around each coordinate axis.

The diaphragm portion of each of the above-described sensors functions as a flexibly deformed portion which causes elastic deformation and undergoes deformation upon exertion of an external force but returns to an original state when no external force is found. In general, in order to increase the detection sensitivity of force, the diaphragm portion is required to increase its flexibility by decreasing the thickness of the diaphragm portion or making the diaphragm portion with a material which can be easily deflected. However, exertion of an excessive external force will cause excessive deflection beyond the limit of elastic deformation at the diaphragm portion. This excessive deflection causes problems, for example, the diaphragm portion may not return to its original shape and the diaphragm portion may be broken after removal of the external force. In particular, in a force sensor with high sensitivity into which a sensitive diaphragm portion which causes deflection upon exertion of a very slight external force is assembled, the diaphragm portion may be more likely to be broken when an excessive external force is exerted. Therefore, in Patent Document 7, disclosed is such technology that a stopper member is used to control displacement so that a diaphragm portion undergoes displacement within a predetermined tolerance even upon exertion of an excessive external force.

PRIOR ART DOCUMENTS

Patent Documents

Patent Document 1: Japanese Unexamined Patent Publication No. H4-148833

Patent Document 2: Japanese Unexamined Patent Publication No. 2001-165790

Patent Document 3: Japanese Unexamined Patent Publication No. H6-174571

Patent Document 4: Japanese Unexamined Patent Publication No. 2004-69405

Patent Document 5: Japanese Unexamined Patent Publication No. H8-226931

Patent Document 6: Japanese Unexamined Patent Publication No. 2002-71705

Patent Document 7: Japanese Unexamined Patent Publication No. 2010-8343

SUMMARY OF THE INVENTION

Problems to be Solved by the Invention

As described above, in a force sensor that detects an external force on the basis of deformation of the flexibly deformed portion (diaphragm portion), the flexibly deformed portion is decreased in thickness or made of a material which will easily cause deflection, thereby increasing the detection sensitivity. However, the flexibly deformed portion loses its toughness. Therefore, in order to protect the flexibly deformed portion from an excessive external force, there is needed some kind of displacement control structure. In view of the above description, the previously described Patent Document 7 has disclosed technology by which there is adopted a structure for making a through-hole around a disk-shaped force receiving body to which an external force is exerted and accommodating a stopper member fixed on a seating in the through-hole, thereby controlling displacement of the disk-shaped force receiving body within a predetermined tolerance by using the seating and the stopper member.

However, these types of force sensors which have been so far proposed have difficulty in further increasing the detection sensitivity. It is also necessary for attaining displacement control to form a through-hole on the disk-shaped force receiving body or dispose the stopper member. This poses such a problem that the force sensor is complicated in structure.

Thus, an object of the present invention is to provide a force sensor which is simple in structure, high in detection sensitivity and also sufficient in toughness.

Means to Solve the Problems (1) The first feature of the present invention resides in a force sensor comprising:

a supporting substrate;

an annular detector which is disposed above the supporting substrate;

a columnar body which extends upward from a central part of an upper surface of the supporting substrate;

a flexible connection member which connects the columnar body with the annular detector;

detection elements, each of which outputs a measurement value according to displacement of the annular detector with respect to the supporting substrate; and a detection circuit which detects an exerted external force on the basis of the measurement value;

the force sensor having such functions that when an external force is exerted on the annular detector in a state that the supporting substrate is fixed, the flexible connection member undergoes deflection, by which the annular detector gives displacement to the supporting substrate and the detection circuit detects the external force on the basis of change in the measurement value resulting from the displacement, and the force sensor further comprising:

an external protrusion portion which protrudes further outside from an outer circumferential part of the annular detector; and a displacement control portion which is fixed at a position opposing the external protrusion portion on the supporting substrate;

wherein, when a magnitude of the exerted external force is within a predetermined tolerance, a vertical clearance is kept between a lower surface of the external protrusion portion and an upper surface of the displacement control portion, and when a magnitude of the exerted external force is in excess of the tolerance, the lower surface of the external protrusion portion is brought into contact with the upper surface of the displacement control portion, thereby controlling displacement of the annular detector.

(2) The second feature of the present invention resides in a force sensor having the first feature, wherein the external protrusion portion is structured so as to protrude outside from an upper part of an outer circumference of the annular detector and a lower part of the outer circumference of the annular detector is given as an exposure surface of the outer circumference, when a magnitude of the exerted external force is within a predetermined tolerance, a lateral clearance is kept between the exposure surface of the outer circumference and an opposing surface of the displacement control portion, and when a magnitude of the exerted external force is in excess of the tolerance, the exposure surface of the outer circumference is brought into contact with the opposing surface of the displacement control portion, thereby controlling displacement of the annular detector.

(3) The third feature of the present invention resides in a force sensor having the second feature, wherein the annular detector is constituted with a first cylindrical structural body, the external protrusion portion is constituted with a second cylindrical structural body in which an outer circumferential surface of the first cylindrical structural body is given as an inner circumferential surface, and the displacement control portion is constituted with a third cylindrical structural body which has an upper surface opposing a lower surface of the second cylindrical structural body, and in a state that no external force is exerted, each of the cylindrical structural bodies is disposed in such a manner that any one of a central axis of the first cylindrical structural body, a central axis of the second cylindrical structural body and a central axis of the third cylindrical structural body is given as a same axis orthogonal to the upper surface of the supporting substrate.

(4) The fourth feature of the present invention resides in a force sensor having the third feature, wherein the columnar body is constituted with a columnar structural body which has a same central axis as the central axis of each of the cylindrical structural bodies, and the flexible connection member is constituted with an annular plate-shaped body in which an inner circumferential part thereof is connected to an outer circumferential surface of the columnar body and an outer circumferential part thereof is connected to an inner circumferential surface of the annular detector.

(5) The fifth feature of the present invention resides in a force sensor having the second feature, wherein the annular detector is constituted with a first polygonal tubular structural body, the external protrusion portion is constituted with a second polygonal tubular structural body in which an outer circumferential surface of the first polygonal tubular structural body is given as an inner circumferential surface thereof, the displacement control portion is constituted with a third polygonal tubular structural body which has an upper surface opposing a lower surface of the second polygonal tubular structural body, and in a state that no external force is exerted, each of the polygonal tubular structural bodies is disposed in such a manner that any one of a central axis of the first polygonal tubular structural body, a central axis of the second polygonal tubular structural body and a central axis of the third polygonal tubular structural body is given as a same axis orthogonal to the upper surface of the supporting substrate.

(6) The six feature of the present invention resides in a force sensor having any one of the first to the fifth features, wherein the columnar body, the flexible connection member, the annular detector and the external protrusion portion are given as an upper structural body which is composed of an integrated structural body made of a same material.

(7) The seventh feature of the present invention resides in a force sensor having any one of the first to the sixth features, wherein the supporting substrate and the displacement control portion are given as a lower structural body which is composed of an integrated structural body made of a same material.

(8) The eighth feature of the present invention resides in a force sensor having any one of the first to the seventh features, wherein a hole portion for attachment for attaching a first object disposed above is formed at the external protrusion portion, a hole portion for attachment for attaching a second object disposed below is formed at a position where a displacement control portion of the supporting substrate is disposed, a hole portion for attachment for attaching the columnar body is formed at a position in contact with the columnar body of the supporting substrate, and a hole portion for attachment is formed at a corresponding position of the columnar body, screws or bolts which have been inserted into the hole portions for attachment are used to connect the external protrusion portion with the first object, connecting the supporting substrate with the second object, and connecting the supporting substrate with the columnar body, and in a state that one of the first object and the second object is fixed, an external force exerted on the other can be detected.

(9) The ninth feature of the present invention resides in a force sensor having any one of the first to the eighth features, wherein tolerance of a magnitude of an external force is set within a range where the flexible connection member undergoes elastic deformation by exertion of the external force, and displacement of the annular detector is suppressed within the tolerance by the displacement control portion, thereby causing the flexible connection member to deform within a range of elastic deformation.

(10) The tenth feature of the present invention resides in a force sensor having any one of the first to the ninth features, wherein a sealing member made of an elastic deformation material is filled into the vertical clearance or the lateral clearance, thereby sealing off from an outside a space at which the detection elements are disposed.

(11) The eleventh feature of the present invention resides in a force sensor having any one of the first to the tenth features, wherein the detection elements are constituted with capacitive elements having fixed electrodes which are fixed on the upper surface of the supporting substrate and displacement electrodes which are formed at positions opposing the fixed electrodes on a lower surface of the annular detector.

(12) The twelfth feature of the present invention resides in a force sensor having any one of the first to the eleventh features, wherein an insulation substrate having an opening portion for inserting the columnar body at a central part is fixed on the upper surface of the supporting substrate to form the fixed electrodes on an upper surface of the insulation substrate, and the annular detector is constituted with a conductive material and a lower layer part of the annular detector is used as a displacement electrode.

(13) The thirteenth feature of the present invention resides in a force sensor having the twelfth feature, wherein a circuit component which constitutes a detection circuit is disposed on the insulation substrate, and the columnar body, the flexible connection member and the annular detector which are made of a conductive material are used as a part of wiring between the circuit component and the displacement electrode.

(14) The fourteenth feature of the present invention resides in a force sensor having the thirteenth feature, wherein when an XYZ three-dimensional orthogonal coordinate system is defined in such a manner that an origin O is taken at a central position of the upper surface of the supporting substrate, an XY plane is taken at the upper surface of the supporting substrate and a central axis of the columnar body is in alignment with a Z axis, there are formed on the upper surface of the insulation substrate a first fixed electrode disposed at a positive region of an X axis, a second fixed electrode disposed at a negative region of the X axis, a third fixed electrode disposed at a positive region of a Y axis, a fourth fixed electrode disposed at a negative region of the Y axis and a fifth fixed electrode disposed annularly so as to surround a periphery of the Z axis, and these individual fixed electrodes and opposing parts of a common displacement electrode composed of the lower layer part of the annular detector constitute a first capacitive element, a second capacitive element, a third capacitive element, a fourth capacitive element and a fifth capacitive element.

(15) The fifteenth feature of the present invention resides in a force sensor having the fourteenth feature, wherein the detection circuit detects a moment component My of exerted external force around the Y axis on the basis of a difference between a capacitance value of the first capacitive element and a capacitance value of the second capacitive element, detects a moment component Mx of the exerted external force around the X axis on the basis of a difference between a capacitance value of the third capacitive element and a capacitance value of the fourth capacitive element and detects a component of the exerted external force in a direction of the Z axis on the basis of a capacitance value of the fifth capacitive element.

Effects of the Invention

In the force sensor according to the present invention, an annular detector connected via a flexible connection member is installed around a columnar body fixed to a supporting substrate, thereby detecting displacement of the annular detector caused by an external force. Therefore, it is possible to detect a relatively large displacement and also increase the detection sensitivity as compared with a conventional sensor. An external protrusion portion which protrudes further outside is also installed at an outer circumferential part of the annular detector, thereby controlling downward displacement of the external protrusion portion by being in contact with an upper surface of a displacement control portion. As described so far, the annular detector is restricted by its vertical displacement, thus making it possible to protect a flexible connection member from an excessive external force. Since the external protrusion portion is installed further outside the annular detector, its displacement amount is increased to realize efficient displacement control by the displacement control portion. Further, displacement control can be attained by a simple structure to simplify the whole structure of the sensor.

On the other hand, in an embodiment in which the external protrusion portion is structured so as to protrude outside from an upper part of an outer circumferential part of the annular detector and a lower part of the outer circumferential part of the annular detector is given as an outer circumference exposure surface, the outer circumference exposure surface is brought into contact with an opposing surface of the displacement control portion. Thereby, the annular detector can be restricted in its lateral displacement as well and the flexible connection member can be protected more reliably.

BEST MODE FOR CARRYING OUT THE INVENTION

<<<Section 1: Structure of Basic Embodiment>>>

First, a description will be given of a structure of the force sensor of the basic embodiment in the present invention. Major structural constituents of the force sensor are an upper structural body 100 shown in FIG. 1 and FIG. 2 and a lower structural body 200 shown in FIG. 3.

Figure 1:
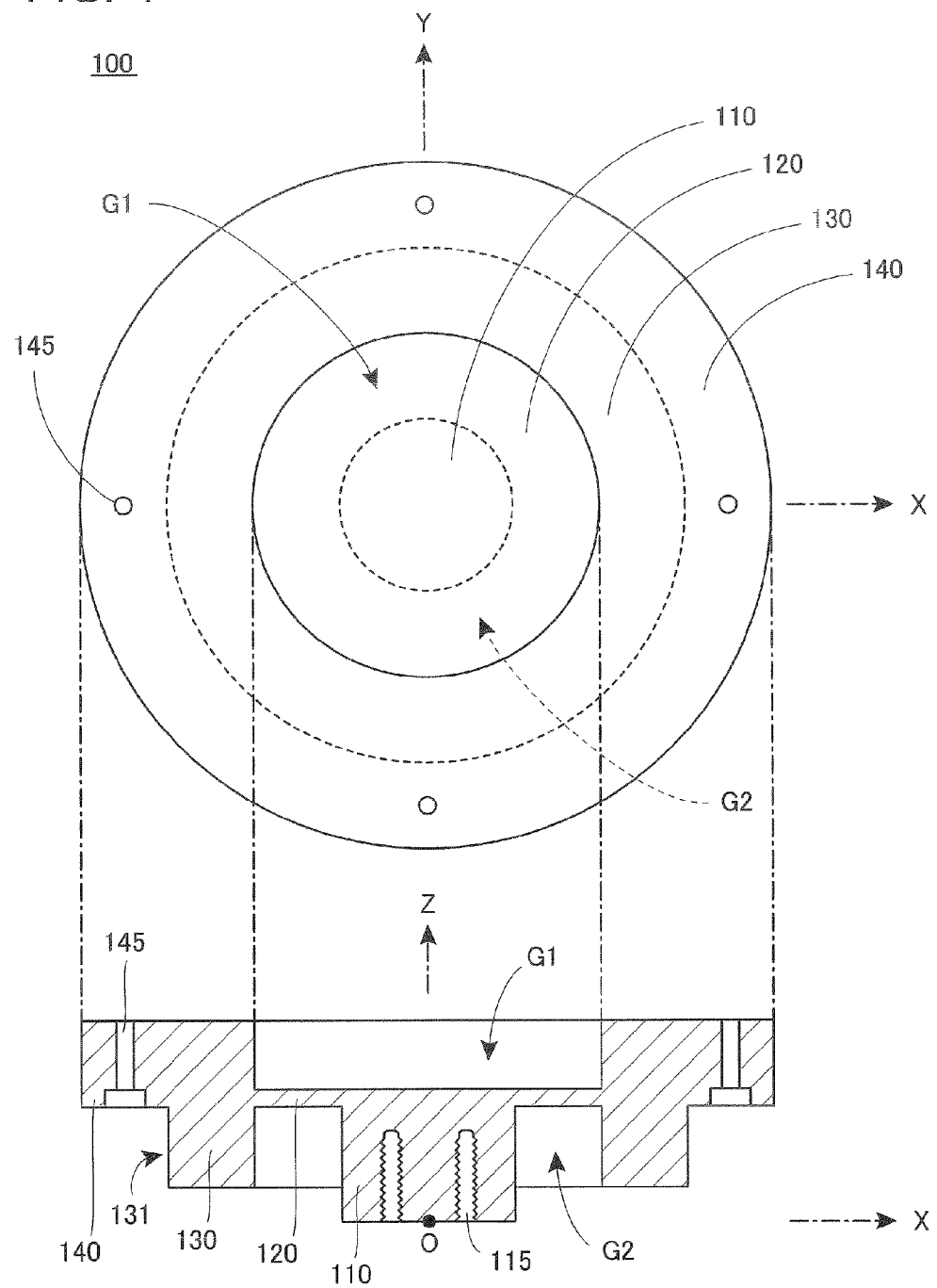
FIG. 1 covers a top view (view at the upper part) of an upper structural body 100 which is a constituent of a force sensor of a basic embodiment in the present invention and a side sectional view (view at the lower part) thereof.

As shown in the top view which is an upper part of FIG. 1, the upper structural body 100 is an assembly of concentric constituents and constituted with the constituents, that is, a columnar body 110, a flexible connection member 120, an annular detector 130 and an external protrusion portion 140 in sequence from inside. In the case of this basic embodiment, as shown in the side sectional view which is a lower part of FIG. 1, the upper structural body 100 is composed of an integrated structural body which is made of the same material (for example, aluminum alloy or stainless steel). Therefore, any one of the columnar body 110, the flexible connection member 120, the annular detector 130 and the external protrusion portion 140 is an element which constitutes a part of the integrated structural body. In the top view which is the upper part of FIG. 1, an outer circumferential position of the columnar body 110 and that of the annular detector 130 are indicated with broken lines.

In this embodiment, the columnar body 110 is a columnar structural body and fixed to a central part of the lower structural body 200 as will be described later. As shown in the side sectional view which is the lower part of FIG. 1, a threaded hole for attachment 115, the inner surface of which is threaded, is formed on a lower surface of the columnar body 110. The columnar body 110 is attached to the lower structural body 200 by using the threaded hole for attachment 115.

The flexible connection member 120 is an annular plate-shaped body (thin washer-shaped structural body) which is installed around the columnar body 110, an inner circumferential part thereof is connected to an outer circumferential surface of the columnar body 110, while an outer circumferential part thereof is connected to an inner circumferential surface of the annular detector 130. The flexible connection member 120 which is composed of the same material as that of the columnar body 110 or the annular detector 130 is provided with flexibility necessary for detecting an external force due to a thin constituent and, therefore, functions as a diaphragm.

The annular detector 130 is a cylindrical structural body which is thick (thickness in a radial direction) and also disposed at the periphery of the flexible connection member 120, and an inner circumferential surface thereof is connected to an outer circumferential part of the flexible connection member 120. As a result, the annular detector 130 is indirectly connected to the lower structural body 200, as will be described later, via the flexible connection member 120 and the columnar body 110. In this case, the flexible connection member 120 is provided with flexibility. Thus, when an external force is exerted on the annular detector 130 in a state that the columnar body 110 is fixed, the flexible connection member 120 undergoes deflection and the annular detector 130 causes displacement according to the exerted external force.

The external protrusion portion 140 is a cylindrical structural body which is thick (thickness in a radial direction) and also disposed at the periphery of the annular detector 130. In this embodiment, as shown at the lower part of FIG. 1, the external protrusion portion 140 is structured so as to protrude externally from an upper part of an outer circumference of the annular detector 130, and a lower part of the outer circumference of the annular detector 130 is given as an outer circumference exposure surface 131. As will be described later, the external protrusion portion 140 functions to restrict displacement of the annular detector 130 within a predetermined tolerance. In addition, the external protrusion portion 140 is provided with a through-hole for attachment 145 at four sites. These through-holes for attachment 145 are used on attachment of the upper structural body 100 to a different object. An illustrated example is such that a bolt is inserted for attachment, and there is provided a space for accommodating the head of the bolt at a lower part of the through-hole for attachment 145.

As apparent from the side sectional view which is the lower part of FIG. 1, a groove portion G1 which constitutes a columnar space is formed on the upper surface of the upper structural body 100, and an annular groove portion G2 which constitutes a doughnut-shaped space is formed on the lower surface thereof. The flexible connection member 120 is constituted with a thin part which is held between the groove portion G1 and the annular groove portion G2.

Figure 2:
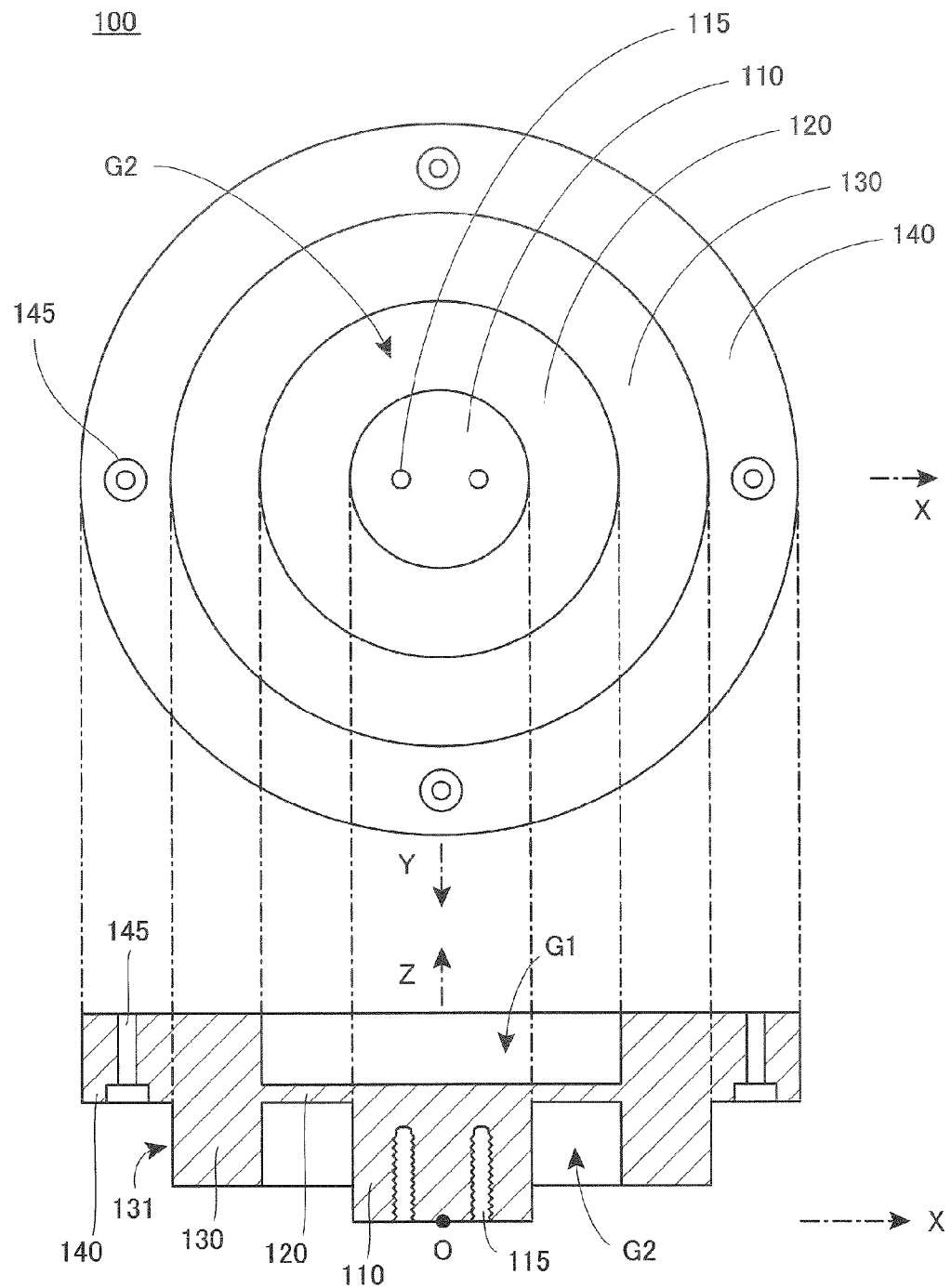
FIG. 2 covers a bottom view (view at the upper part) of the upper structural body 100 shown in FIG. 1 and a side sectional view (view at the lower part) thereof.

The upper part of FIG. 2 is a bottom view of the upper structural body 100, while the lower part of FIG. 2 is a side sectional view thereof (the same as the lower part of FIG. 1). With reference to FIG. 2, it will be easily understood that the upper structural body 100 is an assembly of constituents, that is, the column-shaped columnar body 110, the flexible connection member 120 composed of an annular plate-shaped body, the annular detector 130 composed of a thick cylindrical structural body and the external protrusion portion 140 composed of a thick cylindrical structural body in sequence from inside.

In addition, in this case, for convenience of description, there is defined an XYZ three-dimensional orthogonal coordinate system in which an origin O is taken at a central part of the bottom of the columnar body 110, an X axis is taken on the right side of the side sectional view, a Z axis is taken above the side sectional view and a Y axis is taken in a direction perpendicular to the space of the side sectional view. Then, the following description will be given.

Figure 3:
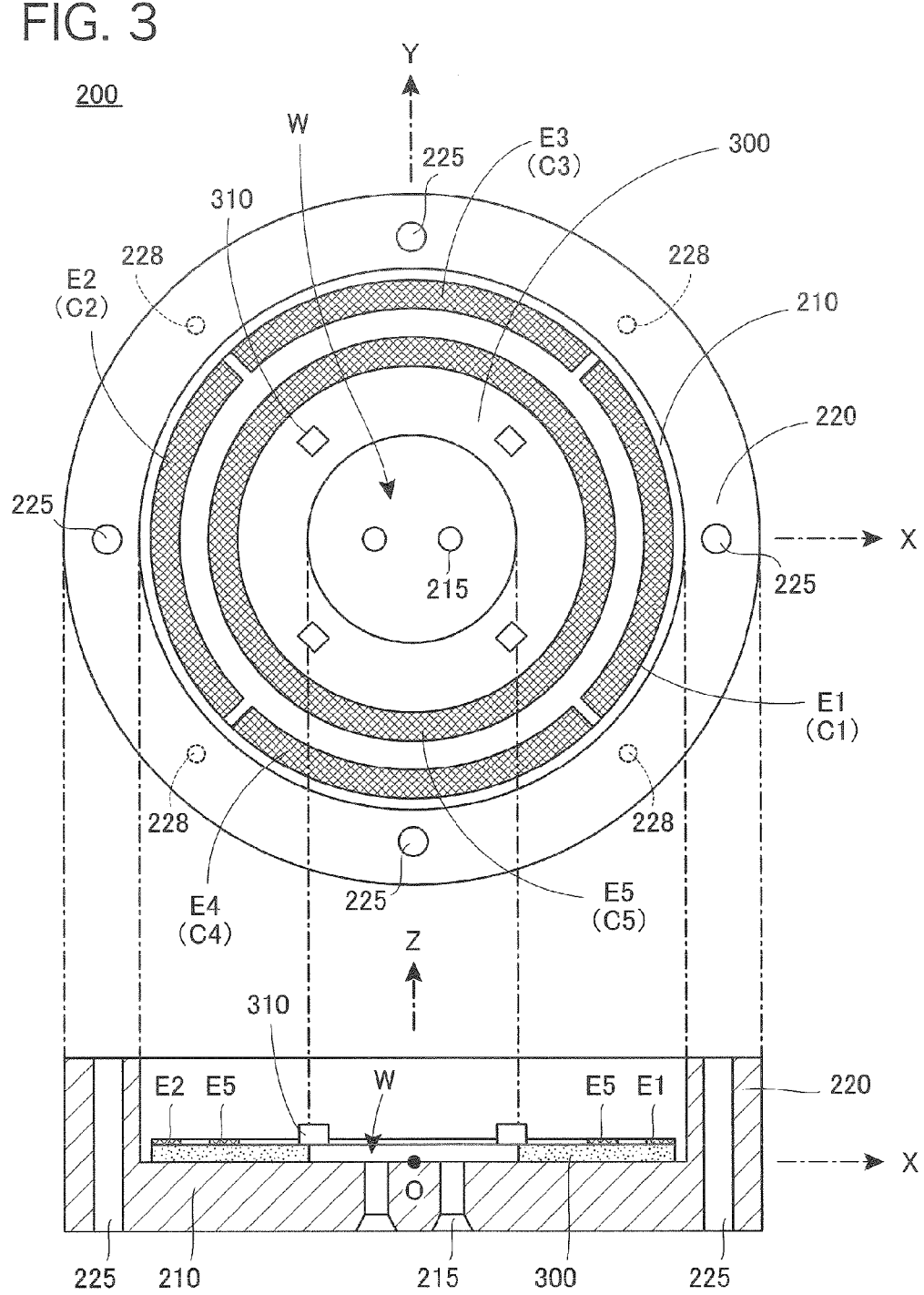
FIG. 3 covers a top view (view at the upper part) of a lower structural body 200 and an insulation substrate 300 which are constituents of the force sensor of the basic embodiment in the present invention and a side sectional view (view at the lower part) thereof. In addition, a mesh-like hatching in the top view is to clearly indicate a shape of each of fixed electrodes E1 to E5 and does not indicate a sectional view.

Next, a description will be given of a structure of the lower structural body 200. FIG. 3 covers a top view (view at the upper part) of the lower structural body 200 and the insulation substrate 300 as well as a side sectional view thereof (view at the lower part). As shown in the drawing, the lower structural body 200 is constituted with a plate-shaped supporting substrate 210 and a displacement control portion 220 which is formed so as to protrude upward from a peripheral part thereof. While the supporting substrate 210 is composed of a disk-shaped structural body, the displacement control portion 220 is composed of a cylindrical structural body which is thick (thickness in a radial direction). However, in this basic embodiment, as shown in the side sectional view which is the lower part of FIG. 3, the lower structural body 200 is composed of an integrated structural body made of the same material (for example, aluminum alloy or stainless steel). Therefore, both the supporting substrate 210 and the displacement control portion 220 are elements which constitute a part of the integrated structural body.

In this case as well, for convenience of description, there is defined an XYZ three-dimensional orthogonal coordinate system in which an origin O is taken at a central part of the upper surface of the supporting substrate 210, an X axis is taken on the right side of the side sectional view, a Z axis is taken above the side sectional view, and a Y axis is taken in a direction perpendicular to the space of the side sectional view, and the following description will be given. The supporting substrate 210 is a disk extending along an XY plane. The side sectional view which is the lower part of FIG. 3 is to show a cross section obtained by cutting the lower structural body 200 along the XZ plane.

As shown in the side sectional view, through-holes for attachment 215 are provided at a central part of the supporting substrate 210, and through-holes for attachment 225 are provided at a peripheral part thereof. Each of the through-holes for attachment 215 is used for fixing the columnar body 110 of the upper structural body 100. As an illustrated example, a screw is inserted through from below to above for attachment. A space for accommodating the head of the screw is provided below the through-hole for attachment 215. On the other hand, each of the through-holes for attachment 225 is a hole portion for inserting a screw from below into a through-hole for attachment 145 as shown in FIG. 1. Further, each of four threaded holes for attachment 228 which is shown with a broken-line circle on the upper part of FIG. 3 is a hole portion formed from the lower surface of the supporting substrate 210 (since they are formed at a position deviated at 45 degrees with respect to the X axis, they are not shown in the side sectional view which is the lower part of FIG. 3). Each of the threaded holes for attachment 228 is threaded on an inner surface thereof and used when the lower structural body 200 is attached to a different object.

As described so far, a columnar accommodating space which is surrounded by the cylindrical displacement control portion 220 at the periphery thereof is formed on the upper surface of the supporting substrate 210. An insulation substrate 300 and a constituent associated with the insulation substrate 300 are accommodated inside the accommodating space.

The insulation substrate 300 is a washer-shaped circuit substrate (for example, a glass epoxy substrate) having a circular opening portion W for inserting the columnar body 110 into the central part and it is fixed on the upper surface of the supporting substrate 210. Further, as shown in the top view which is the upper part of FIG. 3, five pieces of individual fixed electrodes E1 to E5 and circuit components 310 are fixed on the upper surface of the insulation substrate 300. In addition, a mesh-like hatching in the top view is to clearly show the shape of each of the fixed electrodes E1 to E5 and does not show a sectional view. Further, reference numerals C1 to C5 which are bracketed below the reference numerals of individual fixed electrodes E1 to E5 indicate capacitive elements, each of which is constituted with each of the fixed electrodes E1 to E5 and a common displacement electrode (a lower layer part of the annular detector 130) in opposing thereto, as will be described later.

As illustrated, the individual fixed electrode E1 is a circular-arc electrode which is disposed at a positive region of the X axis, the individual fixed electrode E2 is a circular-arc electrode which is disposed at a negative region of the X axis, the individual fixed electrode E3 is a circular-arc electrode which is disposed at a positive region of the Y axis, and the individual fixed electrode E4 is a circular-arc electrode which is disposed at a negative region of the Y axis. Further, the individual fixed electrode E5 is an annular-ring-shaped electrode which is disposed so as to surround the periphery of the Z axis. A disposed pattern of each of these electrodes is kept symmetrical with respect to both an XZ plane and a YZ plane.

On the other hand, each of the circuit components 310 is a component for constituting a detection circuit which will be described later.

In reality, it is constituted with a resistance element, an arithmetic processing IC, etc., and shown in a square block for the convenience of description in the drawing. Further, in reality, wiring is provided between an electrode and a circuit component 310. However, in this case, the illustration of wiring is omitted.

Figure 4:
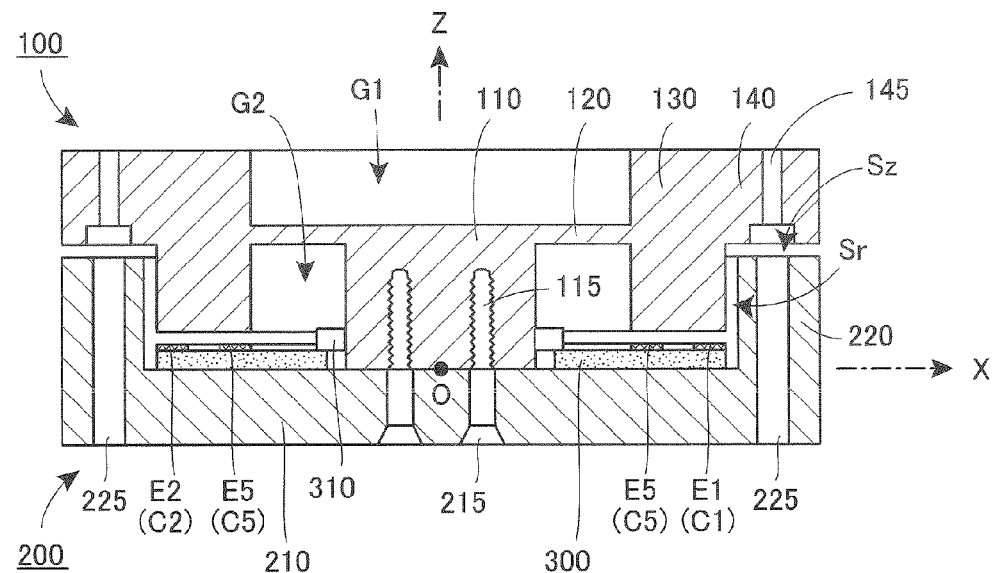
FIG. 4 is a side sectional view of the force sensor of the basic embodiment in the present invention.

The force sensor of the basic embodiment in the present invention is constituted by connecting the upper structural body 100 shown in FIG. 1 and FIG. 2 with the lower structural body 200 shown in FIG. 3. FIG. 4 is a side sectional view of the thus-constituted force sensor. In reality, a screw is inserted from each of the through-holes for attachment 215 to each of the threaded holes for attachment 115 and tightened up, by which the columnar body 110 is fixed at a central part of the upper surface of the supporting substrate 210. Thereby, the upper structural body 100 is firmly connected with the lower structural body 200 (in FIG. 4, the screw is not illustrated).

As described so far, the through-hole for attachment 215 which is formed at a position in contact with the columnar body 110 of the supporting substrate 210 is a hole portion for attachment for attaching the columnar body 110. The threaded hole for attachment 115 which is formed at a position corresponding to the lower surface of the columnar body 110 is a hole portion for attachment at which a screw is used for attachment. A screw or a bolt is inserted between them for tightening, by which the upper structural body 100 is jointed to the lower structural body 200.

On the other hand, the through-hole for attachment 145 formed at the external protrusion portion 140 is a hole portion for attachment for attaching the upper structural body 100 to a first object (not illustrated) disposed at an upper part thereof by using a screw or a bolt. The through-hole for attachment 225 is a hole portion for inserting a screw which is to be inserted into the through-hole for attachment 145 from below. Further, as described previously, the threaded hole for attachment 228 is formed at a position where the displacement control portion 220 of the supporting substrate 210 is disposed (refer to the upper part of FIG. 3). The lower structural body 200 can be attached to a second object (not illustrated) disposed at a lower part thereof by using a screw or a bolt.

Thus, the force sensor is connected to a space between the first object and the second object, by which it is possible to detect an external force exerted on the other in a state that one of the first object and the second object is fixed. For example, the force sensor is used by being connected to a joint between an upper arm and a lower arm of a robot, by which it is possible to detect an external force exerted on the lower arm in a state that the upper arm is fixed.

<<<Section 2: Detection Motions by Basic Embodiment>>>

Next, a description will be given of motions for detecting an external force by the force sensor of the basic embodiment shown in FIG. 4. As described in Section 1, the force sensor is constituted by jointing the upper structural body 100 to the lower structural body 200. In view of functional aspects, however, the force sensor is fundamentally constituted with the supporting substrate 210, the annular detector 130 disposed above the supporting substrate 210, the columnar body 110 extending upward from a central part of the upper surface of the supporting substrate 210, the flexible connection member 120 which connects the columnar body 110 with the annular detector 130, the external protrusion portion 140 which protrudes further outside from an outer circumferential part of the annular detector 130, and the displacement control portion 220 which is fixed at a position opposing the external protrusion portion 140 on the supporting substrate 210.

The force sensor is also provided with a detection element which outputs a measurement value according to a distance between a lower surface of the annular detector 130 and an upper surface of the supporting substrate 210 as a constituent for electrically detecting an external force exerted. More specifically, five sets of capacitive elements C1 to C5 which are constituted with five pieces of individual fixed electrodes E1 to E5 indicated by giving mesh-like hatchings to the upper part of FIG. 3 and a displacement electrode composed of a lower layer part of the annular detector 130 perform functions as a detection element which outputs a measurement value according to a distance between the lower surface of the annular detector 130 and the upper surface of the supporting substrate 210 (that is, a measurement value according to displacement with respect to the supporting substrate 210 of the annular detector 130).

As shown in FIG. 4, a lower surface of the thick cylindrical annular detector 130 is disposed above the five pieces of individual fixed electrodes E1 to E5, with a certain clearance kept. If the displacement electrode opposing to the individual fixed electrodes E1 to E5 is formed on the lower surface, capacitive elements are formed by counter electrodes opposed with each other. In the case of this embodiment, since the upper structural body 100 is constituted with a metal such as aluminum alloy or stainless steel, that is, a conductive material, the annular detector 130 is also composed of a conductive material. Therefore, the lower layer part of the annular detector 130 performs a function as a common displacement electrode. As a result, five sets of the capacitive elements C1 to C5 are constituted with five pieces of individual fixed electrodes E1 to E5 and the lower layer part of the annular detector 130 opposing these electrodes.

In short, in the case of this embodiment, the detection element is constituted with the capacitive elements which have the fixed electrodes E1 to E5 fixed on the upper surface of the supporting substrate 210 and the displacement electrode formed at positions opposing the fixed electrodes E1 to E5 on the lower surface of the annular detector 130. Further, the annular detector 130 is constituted with a conductive material and the lower layer part of the annular detector 130 is used as the displacement electrode.

In general, a capacitance value of a capacitive element changes according to a distance between a pair of electrodes which constitute the capacitive element. It is, therefore, possible to determine a distance between each of the five pieces of individual fixed electrodes E1 to E5 and the lower surface of the annular detector 130 by measuring a capacitance value of each of five sets of capacitive elements C1 to C5. Therefore, the five sets of capacitive elements C1 to C5 perform functions at their individual positions as a detection element for outputting a measurement value according to a distance between the lower surface of the annular detector 130 and the upper surface of the supporting substrate 210. Next, the detection circuit constituted with the circuit component 310 performs functions to detect an exerted external force on the basis of thus-obtained measurement values.

In addition, in the case of this embodiment, the circuit component 310 which constitutes the detection circuit is disposed on the insulation substrate 300. Further, since the upper structural body 100 is entirely constituted with a conductive material, the columnar body 110, the flexible connection member 120 and the annular detector 130 which are constituted with a conductive material can be used as a part of wiring between the circuit component 310 and the displacement electrode (the lower layer part of the annular detector 130). That is, in practice, wiring which connects five pieces of individual fixed electrodes E1 to E5 with the circuit component 310 and wiring which connects the columnar body 110 with the circuit component 310 are provided, by which there can be secured wiring necessary for the five sets of capacitive elements C1 to C5.

Next, consideration will be given to a case where motions are detected for an external force exerted on the annular detector 130, with the supporting substrate 210 being fixed, in the force sensor shown in FIG. 4 (as a matter of course, a mechanically equivalent phenomenon is found where an external force is exerted on the supporting substrate 210 in a state that the annular detector 130 is fixed).

As already described, the flexible connection member 120 undergoes deflection due to exertion of an external force. Therefore, where an external force is exerted on the annular detector 130, the flexible connection member 120 is deflected. Thereby, the annular detector 130 undergoes displacement with respect to the supporting substrate 210. This displacement is caused in various modes, depending on a direction and magnitude of the exerted external force. However, the detection circuit is able to detect independently individual components of the exerted external force on the basis of change in measurement values (capacitance values) of five sets of capacitive elements C1 to C5 resulting from the displacement. In the case of this embodiment, it is possible to detect independently a moment component Mx around the X axis, a moment component My around the Y axis and a force component Fz in the direction of the Z axis. Hereinafter, a brief description will be given of a principle of detection.

Figure 5:
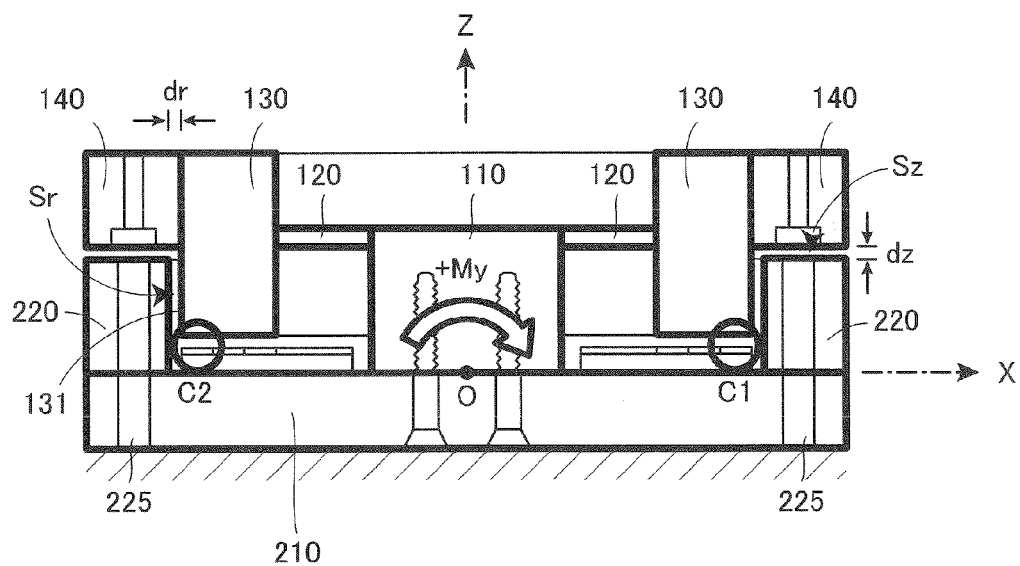
FIG. 5 is a drawing which explains motions when moment +My around the Y axis acts on the force sensor shown in FIG. 4.

FIG. 5 is a drawing which explains detection motions of the force sensor shown in FIG. 4 when a moment +My around the Y axis is exerted on the annular detector 130 in a state that the supporting substrate 210 is fixed. In addition, here, in order to clarify roles of individual constituents, the supporting substrate 210, the columnar body 110, the flexible connection member 120, the annular detector 130, the external protrusion portion 140 and the displacement control portion 220 are indicated by being individually enclosed with thick lines.

As indicated by the thick-line arrows in the drawing, the moment +My around the Y axis is a force which allows the annular detector 130 to rotate clockwise at the center of the origin O (moment −My is a force which causes reverse rotation). Therefore, the flexible connection member 120 deflects, by which a right-hand part of the annular detector 130 in the drawing undergoes downward displacement, while a left-hand part thereof undergoes upward displacement. As a result, the capacitive element C1 enclosed with the thick line circle is decreased in interval between electrodes to increase a capacitance value, while the capacitive element C2 enclosed with the thick line circle is increased in interval between electrodes to decrease a capacitance value. Therefore, where the detection circuit is used to determine a difference between the capacitance values of the capacitive elements C1, C2, a sign of the difference indicates a direction of moment around the Y axis, and an absolute value of the difference indicates a magnitude of moment around the Y axis.

In accordance with exactly the same principle, where the detection circuit is used to determine a difference between the capacitance values of the capacitive elements C3, C4, a sign of the difference indicates a direction of moment around the X axis and an absolute value of the difference indicates a magnitude of moment around the X axis.

Figure 6:
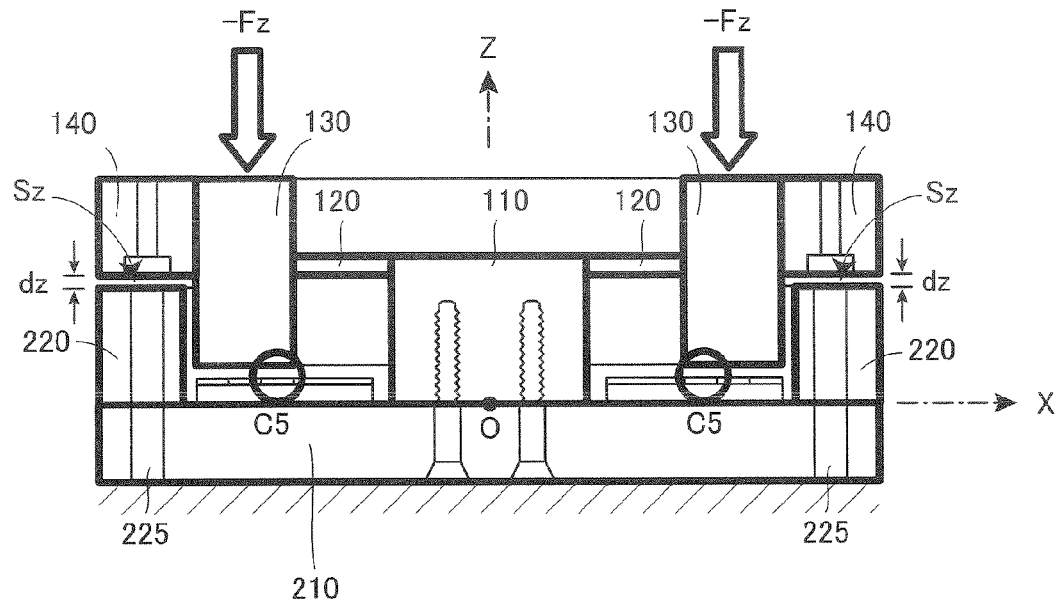
FIG. 6 is a drawing which explains motions when a force −Fz in the direction of the Z axis is exerted on the force sensor shown in FIG. 4.

On the other hand, FIG. 6 is a drawing which explains detection motions of the force sensor shown in FIG. 4 when a force −Fz in the negative direction of the Z axis is exerted on the annular detector 130 in a state that the supporting substrate 210 is fixed. In this case as well, individual constituents are individually indicated by being enclosed with thick lines.

As shown with the thick line arrow in the drawing, the force −Fz is a force which presses the annular detector 130 downward in the negative direction of the Z axis (On the other hand, the force +Fz is a force which pushes it upward in the positive direction of the Z axis). Thus, the flexible connection member 120 deflects, by which the annular detector 130 undergoes downward displacement as a whole in the drawing. As a result, the capacitive element C5 enclosed with the thick line circle is decreased in interval between electrodes to increase a capacitance value. Therefore, where the detection circuit is used to determine an increased amount of the capacitance value of the capacitive element C5, the increased amount indicates a magnitude of the force component −Fz in the negative direction of the Z axis. On the other hand, where the capacitive element C5 is decreased in capacitance value, the decreased amount indicates a magnitude of force component +Fz in the positive direction of the Z axis.

As a result, in this embodiment, when the XYZ three-dimensional orthogonal coordinate system is defined in such a manner that the origin O is taken at the center of the upper surface of the supporting substrate 210, the XY plane is taken on the upper surface of the supporting substrate 210 and a central axis of the columnar body 110 is in alignment with the Z axis, a first fixed electrode E1 disposed at a positive region of the X axis, a second fixed electrode E2 disposed at a negative region of the X axis, a third fixed electrode E3 disposed at a positive region of the Y axis, a fourth fixed electrode E4 disposed at a negative region of the Y axis and a fifth fixed electrode E5 disposed annularly so as to surround the periphery of the Z axis are formed on the upper surface of the insulation substrate 300.

Further, the individual fixed electrodes E1 to E5 and a part opposing a common displacement electrode composed of the lower layer part of the annular detector 130 are used to form a first capacitive element C1, a second capacitive element C2, a third capacitive element C3, a fourth capacitive element C4 and a fifth capacitive element C5. Next, the detection circuit performs functions of detecting a moment component My of an exerted external force around the Y axis on the basis of a difference between a capacitance value of the first capacitive element C1 and a capacitance value of the second capacitive element C2, detecting a moment component Mx of an exerted external force around the X axis on the basis of a difference between a capacitance value of the third capacitive element C3 and a capacitance value of the fourth capacitive element C4, and detecting a component of an exerted external force in the direction of the Z axis on the basis of a capacitance value of the fifth capacitive element C5.

As described so far, the force sensor of the basic embodiment is able to detect independently the moment component Mx around the X axis, the moment component My around the Y axis and the force component Fz in the direction of the Z axis. The detection principle in itself is well known technology and disclosed in Patent Document 7 (Japanese Unexamined Patent Publication No. 2010-008343) and others given previously. However, in this force sensor, the columnar body 110 fixed on the supporting substrate 210 is disposed at the center and the annular detector 130 which undergoes displacement is disposed at the periphery thereof. Thus, there are obtained effects for increasing the detection sensitivity of moments Mx, My in particular. For example, as shown in FIG. 5, since exertion of the moment +My results in great displacement of the annular detector 130 disposed at the periphery, the capacitive elements C1, C2 are subject to a great change in capacitance value, thus making it possible to realize efficient detection with high sensitivity.

The force sensor is also importantly characterized in that the external protrusion portion 140 which protrudes further outside is installed at an outer circumferential part of the annular detector 130, thereby restricting downward displacement of the external protrusion portion 140 due to contact with the upper surface of the displacement control portion 220. For example, as shown on the right side of FIG. 5, a vertical clearance Sz having a predetermined dimension dz is secured between the lower surface of the external protrusion portion 140 and the upper surface of the displacement control portion 220. Where a magnitude of the exerted moment +My is within a predetermined tolerance (until the clearance dimension dz becomes zero), the annular detector 130 is able to freely undergo displacement. However, upon exertion of a great moment in excess of the tolerance, the lower surface of the external protrusion portion 140 is brought into contact with the upper surface of the displacement control portion 220 (the clearance dimension dz becomes zero), thereby restricting further displacement of the annular detector 130.

As described so far, the annular detector 130 is restricted by vertical displacement, by which the flexible connection member 120 can be protected from an excessive external force. As a matter of course, upon exertion of a reverse moment −My having an excessive magnitude, on the left side of FIG. 5, the lower surface of the external protrusion portion 140 is brought into contact with the upper surface of the displacement control portion 220, thereby restricting displacement of the annular detector 130. The same is exactly applied to exertion of the moment Mx around the X axis.

On the other hand, with regard to a force in the direction of the Z axis, where the force −Fz in the negative direction of the Z axis is exerted, effects of displacement control can be obtained. That is, as shown in FIG. 6, a vertical clearance Sz having a predetermined dimension dz is secured between the lower surface of the external protrusion portion 140 and the upper surface of the displacement control portion 220, and where a magnitude of the exerted force −Fz is within a predetermined tolerance (until the clearance dimension dz becomes zero), the annular detector 130 is able to freely undergo displacement. However, where a great moment in excess of the tolerance is exerted, the lower surface of the external protrusion portion 140 is brought into contact with the upper surface of the displacement control portion 220 (the clearance dimension dz becomes zero), thereby restricting further displacement of the annular detector 130. In the case of this embodiment, where the force +Fz in the positive direction of the Z axis is exerted (in FIG. 6, where the annular detector 130 undergoes upward displacement), there are obtained no effects of displacement control.

The external protrusion portion 140 is installed further outside the annular detector 130 to result in an increased displacement amount, and the displacement control portion 220 is able to attain efficient displacement control. Further, since displacement control is a simple structure, the sensor can be simplified in its entire structure.

Still further, in the case of this embodiment, the external protrusion portion 140 is structured so as to protrude to the outside from an upper part of the outer circumferential part of the annular detector 130, and a lower part of the outer circumferential part of the annular detector 130 is structured so as to give the outer circumference exposure surface 131. Thus, the outer circumference exposure surface 131 is brought into contact with an opposing surface of the displacement control portion 220 (inner circumferential surface of thick cylindrical structural body). It is, thereby, possible to restrict lateral displacement of the annular detector 130 and also more reliably protect the flexible connection member 120.

That is, as shown on the left side of FIG. 5, the lower part of the outer circumferential part of the annular detector 130 constitutes the outer circumference exposure surface 131, and a lateral clearance Sr having a predetermined dimension dr is secured between the outer circumference exposure surface 131 and an inner circumferential surface of the displacement control portion 220. Where a magnitude of the exerted moment +My is within a predetermined tolerance, the annular detector 130 is able to freely undergo displacement. However, upon exertion of a great moment in excess of the tolerance, the outer circumference exposure surface 131 is brought into contact with the inner circumferential surface of the displacement control portion 220, thereby restricting displacement of the annular detector 130.

As a result, in the case of this embodiment, within a range where the vertical clearance dimension dz or the lateral clearance dimension dr at each site does not become zero, the annular detector 130 is able to freely undergo displacement. However, where one of the above dimensions becomes zero and contact takes place, there is restricted free displacement.

As shown in FIG. 1 and FIG. 2, this embodiment is such that the annular detector 130 is constituted with a first cylindrical structural body and the external protrusion portion 140 is constituted with a second cylindrical structural body in which the outer circumferential surface of the first cylindrical structural body (the lower part is given as the outer circumference exposure surface 131) is given as an inner circumferential surface, and the displacement control portion 220 is constituted with a third cylindrical structural body which has an upper surface opposing the lower surface of the second cylindrical structural body. Next, in a state that no external force is exerted, any one of the central axis of the first cylindrical structural body 130, the central axis of the second cylindrical structural body 140 and the central axis of the third cylindrical structural body 220 is disposed so as to give the same axis orthogonal to the upper surface of the supporting substrate 210 (where the XYZ three-dimensional coordinate system is defined as illustrated, said same axis is the Z axis).

Further, the columnar body 110 is constituted with a columnar structural body having the same central axis as the central axis (the Z axis) of each cylindrical structural body. And, the flexible connection member 120 is constituted with an annular plate-shaped body in which an inner circumferential part thereof is connected with an outer circumferential surface of the columnar body 110 and an outer circumferential part thereof is connected with an inner circumferential surface of the annular detector 130. As a result, in this embodiment, the upper structural body 100 and the lower structural body 200 are fundamentally structured so as to constitute a rotating body with the central axis of the Z axis. Still further, both the upper surface and the lower surface of each cylindrical structural body are planes in parallel with the XY plane.

Due to the above-described geometric structure, functions of displacement control are provided with rotation symmetry. That is, in a state that no external force is exerted, the vertical clearance dimension dz and the lateral clearance dimension dr are the same at any site. Therefore, the vertical clearance dimension dz indicates a tolerance value of displacement of the annular detector 130 in the negative direction of the Z axis, and the lateral clearance dimension dr indicates a tolerance value of displacement of the annular detector 130 in the radial direction.

As a result, in the case of this embodiment, with regard to displacement of the annular detector 130 in the positive direction of the X axis, the displacement in the negative direction of the X axis, the displacement thereof in the positive direction of the Y axis, the displacement in the negative direction of the Y axis and the displacement in the negative direction of the Z axis, provided are such functions that a displacement amount is suppressed within a predetermined tolerance. Therefore, with regard to a moment ±Mx in both directions around the X axis, a moment ±My in both directions around the Y axis, a force ±Fx in both positive and negative directions along the X axis, a force ±Fy in both positive and negative directions along the Y axis and a force −Fz in the negative direction along the Z axis, where a great force or moment in excess of a predetermined tolerance is exerted, such functions are provided that the annular detector 130 is restricted for displacement to protect the flexible connection member 120. However, with regard to a moment ±Mz in both directions around the Z axis and a force +Fz in the positive direction along the Z axis, no functions of displacement control are provided.

In addition, as tolerance of magnitude of an external force, there may be set such a range within which the flexible connection member 120 undergoes elastic deformation by exertion of the external force. This is because as long as the flexible connection member 120 undergoes elastic deformation, it returns to an original state when no external force is available and, therefore, no problems are found in detection functions as the force sensor. If the flexible connection member 120 is excessively deformed beyond a range of elastic deformation, the flexible connection member 120 is unable to return to an original state even when no external force is available, thus resulting in problems of detection functions as the force sensor. There is a case that the flexible connection member 120 may be cracked or broken.

Thus, in practice, it is preferred that displacement of the annular detector 130 is suppressed within the above-described tolerance by the displacement control portion 220, by means of setting appropriate values for the lateral clearance dimension dr and the vertical clearance dimension dz so that the flexible connection member 120 undergoes deformation within a range of elastic deformation.

<<<Section 3: Modified Example of the Present Invention>>>

Next, a description will be given of some modified examples of the force sensor in the present invention.

(1) Modified Example Filled with Sealing Member

Figure 7:
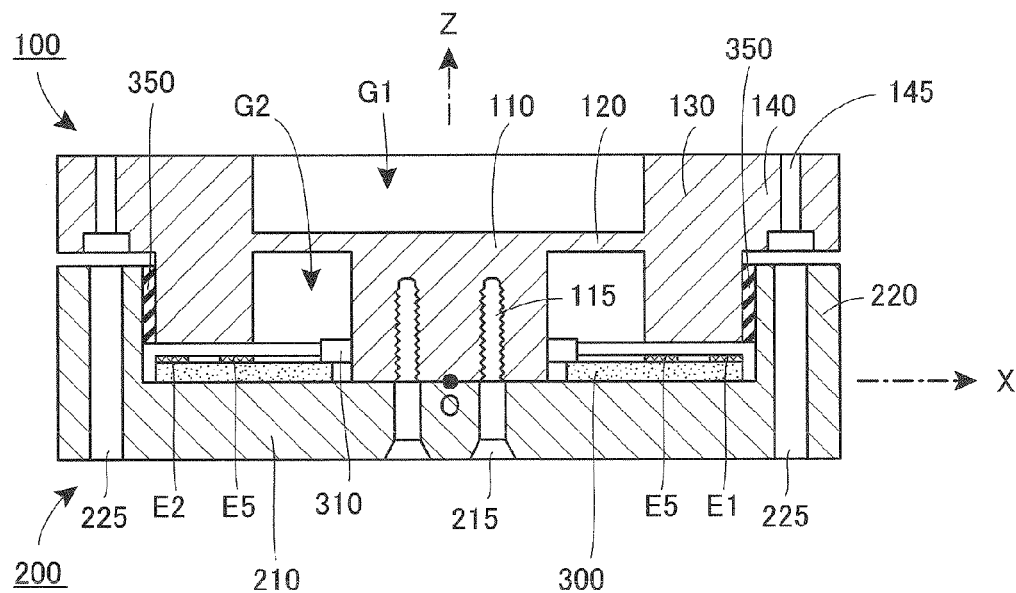
FIG. 7 is a side sectional view which shows a modified example in which a sealing member 350 is added to the force sensor shown in FIG. 4.

FIG. 7 is a side sectional view which shows a modified example in which a sealing member 350 is added to a force sensor in FIG. 4. The illustrated example is such that the sealing member 350 composed of an elastic deformation material is filled into a lateral clearance Sr shown on the left side of FIG. 5 (a clearance between an outer circumference exposure surface 131 and an opposing surface of a displacement control portion 220). It is also acceptable that the sealing member 350 composed of an elastic deformation material is filled into a vertical clearance Sz shown on the right side of FIG. 5 (a clearance between a lower surface of an external protrusion portion 140 and an upper surface of the displacement control portion 220).

The sealing member 350 is filled along an entire circumference of the cylindrical displacement control portion 220, thereby making it possible to seal off from the outside an inner space where detection elements (capacitive elements C1 to C5) and a circuit component 310 are disposed and also to obtain such effects as dust and water prevention. As a matter of course, displacement of the annular detector 130 should not be inhibited by filling of the sealing member 350. Therefore, as the sealing member 350, there is used a soft and sufficiently flexible seal material such as silicone rubber so as not to practically prevent displacement of the annular detector 130.

(2) Modified Example using Polygonal Constituent

In the force sensor of the basic embodiment so far described, a circular constituent is mainly used. However, individual constituents are not necessarily formed in a circular shape. A polygonal constituent including a regular hexagonal or regular octagonal shape may be used.

More specifically, it is acceptable that an annular detector 130 is constituted with a first polygonal tubular structural body, an external protrusion portion 140 is constituted with a second polygonal tubular structural body in which an outer circumferential surface of the first polygonal tubular structural body is given as an inner circumferential surface, and a displacement control portion 220 is constituted with a third polygonal tubular structural body having an upper surface opposing the lower surface of the second polygonal tubular structural body. And, it is also acceptable that each polygonal tubular structural body (in practice preferably is used a regular polygonal tubular structural body) is disposed in such a manner that any one of the central axis of the first polygonal tubular structural body, the central axis of the second polygonal tubular structural body and the central axis of the third polygonal tubular structural body is given as the same axis (Z axis) which is orthogonal to the upper surface of the supporting substrate 210 in a state that no external force is exerted.

As described so far, in the modified example using a polygonal tubular structural body, when the annular detector 130 is rotated around the Z axis, a part of the outer circumference exposure surface is soon brought into contact with a part of the inner circumferential surface of the displacement control portion to stop further rotation. Therefore, with regard to the moment ±Mz in both directions around the Z axis as well, functions of displacement control are provided.

(3) Modified Example of Flexible Connection Member

In the basic embodiment, there has been shown an example in which a diaphragm composed of an annular plate-shaped body is used as the flexible connection member 120. The flexible connection member 120 is not necessarily structured so as to use a diaphragm structure, as long as it is made of a material which can function to connect the columnar body 110 with the annular detector 130 and undergo deflection by exertion of an external force which is to be detected. It is possible to use, for example, a plurality of beam-like structural bodies as the flexible connection member 120. More specifically, it is acceptable to use such a structure in which a total of four beam-like structural bodies with flexibility are installed respectively along a positive X axis, a negative X axis, a positive Y axis and a negative Y axis, and these four beam-like structural bodies are used to bridge a space between the columnar body 110 and the annular detector 130. The use of a diaphragm structure (membrane structure) is, however, able to cover an upper part of an inner space where a detection element and a circuit component 310 are disposed. And, the diaphragm structure is preferable in obtaining effects such as dust and water prevention.

(4) Modified examples of upper structural body and lower structural body

In the force sensor shown in FIG. 4, the columnar body 110, the flexible connection member 120, the annular detector 130 and the external protrusion portion 140 are structurally integrated by the upper structural body 100. The supporting substrate 210 and the displacement control portion 220 are structurally integrated by the lower structural body 200. As a matter of course, it is acceptable that individual constituents are constituted with different components or constituted with components composed of different materials. However, in terms of commercial mass production, as shown in the example of FIG. 4, a basic structural body is constituted with two components, that is, the upper structural body 100 and the lower structural body 200, which is easier in assembly work and also can be reduced in cost.

(5) Modified example constituted with electrode

In the force sensor shown in FIG. 4, an annular detector 130 is constituted with a conductive material and the lower layer part thereof is used as a displacement electrode. Where the annular detector 130 is constituted with an insulation material, a common displacement electrode composed of a conductive material may be formed on the lower surface thereof. As a matter of course, it is acceptable that in place of the common displacement electrode, five pieces of individual displacement electrodes (electrodes opposing respectively to the individual fixed electrodes E1 to E5) are formed on the annular detector 130. It is also acceptable that a single common fixed electrode is formed on an insulation substrate 300 and five pieces of individual displacement electrodes are formed on the annular detector 130.

(6) Modified Example of Components of External Force to be Detected

A description has been so far given of a case where the electrodes are disposed as shown in FIG. 3, thereby detecting three axis components, that is, the moment component Mx around the X axis, the moment component My around the Y axis and the force component Fz in the direction of the Z axis. However, the electrodes will be disposed in an inventive manner, thus making it possible to detect a moment component Mz around the Z axis, a force component Fx in the direction of the X axis and a force component Fy in the direction of the Y axis and also to detect a total of six axis components. The above-described disposition of the electrodes and a detection principle have been disclosed in each of the previously described Patent Documents and, therefore, a specific description will be omitted here.

(7) Modified example of detection element

Here, a description has been given of an example where the capacitive elements C1 to C5 are used as a detection element. The capacitive element is an element quite simple in structure as a detection element which outputs a measurement value according to a distance between a lower surface of an annular detector 130 and an upper surface of a supporting substrate 210. This is in practice most preferable as a detection element. However, the detection element used in the present invention is not necessarily constituted with capacitive elements, as long as it can function to output a measurement value according to displacement of the annular detector 130. It is possible to constitute the detection element by using, for example, a piezoresistive element or a piezoelectric element installed on the surface of a flexible connection member 120.

<<<Section 4: Reference example which omits displacement control structure>>>

Figure 8:
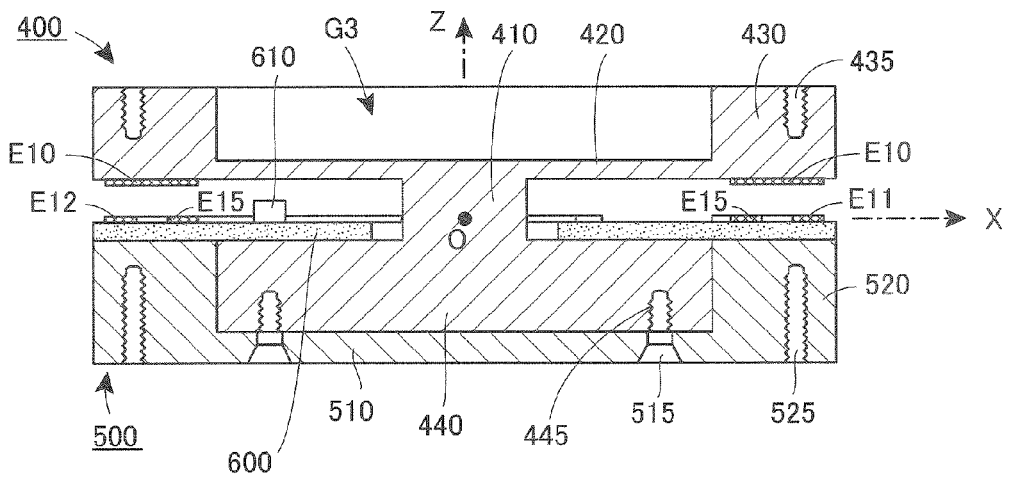
FIG. 8 is a side sectional view which shows a reference example in which a displacement control structure is omitted from the force sensor of the present invention.

Lastly, a description will be given of a reference example obtained by further simplifying the force sensor shown in FIG. 4. FIG. 8 is a side sectional view which shows the reference example which omits a displacement control structure from the force sensor shown in FIG. 4. Since the displacement control structure is omitted, the example is not sufficient in protecting a flexible connection member from an excessive external force but can be made simpler in structure.

As illustrated, this force sensor is structured in such a manner that an upper structural body 400 is jointed to a lower structural body 500 and an insulation substrate 600 is attached. The upper structural body 400 is an integrated structural body which includes a column-shaped columnar body 410, a flexible connection member 420 (diaphragm) composed of an annular plate-shaped body disposed at the periphery thereof, an annular detector 430 composed of a thick cylindrical structural body disposed at the periphery of the upper surface thereof and a disk-shaped base portion 440 disposed below the columnar body 410. On the other hand, the lower structural body 500 is an integrated structural body which includes a circular plate-shaped supporting substrate 510 and a side wall portion 520 composed of a thick cylindrical structural body disposed at the periphery thereof.

A columnar accommodating space suitable for fitting the base portion 440 thereinto is formed on the upper surface of the lower structural body 500. As illustrated, the base portion 440 is fixed in a state of being accommodated into the accommodating space. A threaded hole for attachment 445 and a through-hole for attachment 515 are used for jointing the base portion 440 to the supporting substrate 510 with a screw. Further, a threaded hole for attachment 435 is used for attaching the upper structural body 400 to a different object (not illustrated) disposed above. A threaded hole for attachment 525 is used for attaching the lower structural body 500 to a different object (not illustrated) disposed below.

Figure 9:
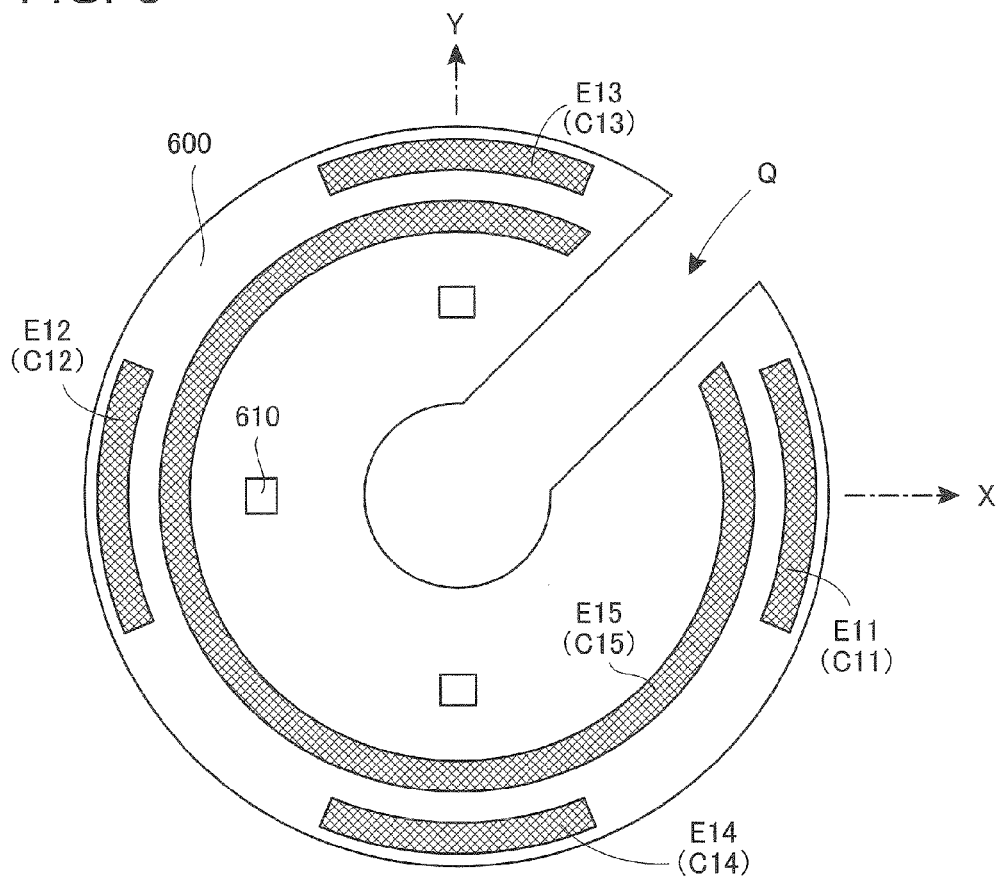
FIG. 9 is a top view of an insulation substrate 600 shown in FIG. 8. In addition, a mesh-like hatching is to clearly indicate a shape of each of fixed electrodes E11 to E15 and does not indicate a sectional view.

As described so far, after the upper structural body 400 has been jointed to the lower structural body 500, an insulation substrate 600 is inserted into an illustrated position. FIG. 9 is a top view which shows the insulation substrate 600 shown in FIG. 8. The insulation substrate 600 is substantially a circular plate-shaped circuit substrate, and a part of which is provided with a slit-shaped opening portion Q. A deep portion of the slit-shaped opening portion Q is a circular opening portion through which the columnar body 410 is inserted. A slit portion which is formed in a radial direction is to allow the columnar body 410 to pass when the insulation substrate 600 is inserted into a position shown in FIG. 8.

As illustrated, five pieces of individual fixed electrodes E11 to E15 are formed on the upper surface of the insulation substrate 600 (a mesh-like hatching is to clearly indicate the shape of each of the individual fixed electrodes E11 to E15 and does not indicate a sectional view). Further, in this example, a circuit component 610 is disposed at three sites.

On the other hand, as shown in FIG. 8, a washer-shaped common displacement electrode E10 is formed on the lower surface of the annular detector 430. The common displacement electrode E10 performs functions as a common electrode opposing each of the individual fixed electrodes E11 to E15. As shown in FIG. 9, individual counter electrodes constitute five sets of capacitive elements C11 to C15. The common displacement electrode E10 is formed in the step of manufacture of the upper structural body 400 and, thereafter, the upper structural body 400 is jointed to the lower structural body 500 and, lastly, the insulation substrate 600 is mounted, by which they can be assembled easily.

In this embodiment, because the upper structural body 400 (annular detector 430) is constituted with an insulation material, the common displacement electrode E10 is formed on the lower surface of the annular detector 430. Where the upper structural body 400 is constituted with a conductive material, the lower layer part of the annular detector 430 performs functions as a common displacement electrode, thereby doing away with the need for forming separately the common displacement electrode E10. Further, in this embodiment, as a common electrode opposing the individual fixed electrodes E11 to E15, the single common displacement electrode E10 is formed. It is, however, acceptable that in place of the single common displacement electrode E10, a washer-shaped outer circumferential electrode opposing the individual fixed electrodes E11 to E14 and a washer-shaped inner circumferential electrode opposing the fixed electrode E15 are formed on the lower surface of the annular detector 430.

A principle in which five sets of the capacitive elements C11 to C15 are used to detect three axis components, that is, a moment component Mx around the X axis, a moment component My around the Y axis and a force component Fz in the direction of the Z axis is exactly the same as a principle on detection motions of the basic embodiment described in Section 2.

INDUSTRIAL APPLICABILITY

The force sensor of the present invention is optimally used in detecting force and moment in order to control motions of robots and industrial machines. This sensor can also be used as a man-machine interface of an input device of electronic equipment. The sensor is in particular effective as a simply structured force sensor which performs functions to detect three components of an XYZ three-dimensional orthogonal coordinate system, that is, a moment Mx around the X axis, a moment My around the Y axis and a force Fz in the direction of the Z axis.

DESCRIPTION OF REFERENCE NUMERALS

100: upper structural body
110: columnar body
115: threaded hole for attachment (hole portion for attachment)
120: flexible connection member
130: annular detector
131: outer circumference exposure surface
140: external protrusion portion
145: through-hole for attachment (hole portion for attachment)
200: lower structural body
210: supporting substrate
21: through-hole for attachment (hole portion for attachment)
220 displacement control portion
225: through-hole for attachment (hole portion for attachment)
228: threaded hole for attachment (hole portion for attachment)
300: insulation substrate
310: circuit component
350: sealing member
400: upper structural body
410: columnar body
420: flexible connection member
430: annular detector
435: threaded hole for attachment (hole portion for attachment)
440: base portion
445: threaded hole for attachment (hole portion for attachment)
500: lower structural body
501: supporting substrate
515: through-hole for attachment (hole portion for attachment)
520: side wall portion 525: threaded hole for attachment (hole portion for attachment)
600: insulation substrate
610: circuit component
C1-C5: capacitive element
C11-C15: capacitive element
dr: lateral clearance dimension
dz: vertical clearance dimension
E1-E5: individual fixed electrodes
E10: common displacement electrode
E11-E15: individual fixed electrodes
Fz: force in the direction of the Z axis
G1: groove portion
G2: annular groove portion
G3: groove portion
Mx: moment around the X axis
My: moment around the Y axis
O: origin of XYZ three-dimensional orthogonal coordinate system
Q: slit-shaped opening portion
Sr: lateral clearance
Sz: vertical clearance
W: opening portion
X: coordinate axis of XYZ three-dimensional orthogonal coordinate system
Y: coordinate axis of XYZ three-dimensional orthogonal coordinate system
Z: coordinate axis of XYZ three-dimensional orthogonal coordinate system

The invention claimed is:

1. A force sensor comprising:
a supporting substrate;
an annular detector which is disposed above the supporting substrate;
a columnar body which extends upward from a central part of an upper surface of the supporting substrate;
a flexible connection member which connects the columnar body with the annular detector;
detection elements, each of which outputs a measurement value according to displacement of the annular detector with respect to the supporting substrate; and
a detection circuit which detects an exerted external force on the basis of the measurement value;
the force sensor having such functions that when an external force is exerted on the annular detector in a state that the supporting substrate is fixed, the flexible connection member undergoes deflection, by which the annular detector gives displacement to the supporting substrate and the detection circuit detects the external force on the basis of change in the measurement value resulting from the displacement, and
the force sensor further comprising:
an external protrusion portion which protrudes further outside from an outer circumferential part of the annular detector; and
a displacement control portion which is fixed at a position opposing the external protrusion portion on the supporting substrate;
wherein, when a magnitude of the exerted external force is within a predetermined tolerance, a vertical clearance is kept between a lower surface of the external protrusion portion and an upper surface of the displacement control portion, and when a magnitude of the exerted external force is in excess of the tolerance, the lower surface of the external protrusion portion is brought into contact with the upper surface of the displacement control portion, thereby controlling displacement of the annular detector, and
the detection elements are constituted with capacitive elements having fixed electrodes which are fixed on the upper surface of the supporting substrate and displacement electrodes which are formed at positions opposing the fixed electrodes on a lower surface of the annular detector.

2. The force sensor according to claim 1, wherein
the external protrusion portion is structured so as to protrude outside from an upper part of an outer circumference of the annular detector and a lower part of the outer circumference of the annular detector is given as an exposure surface of the outer circumference,
when a magnitude of the exerted external force is within a predetermined tolerance, a lateral clearance is kept between the exposure surface of the outer circumference and an opposing surface of the displacement control portion, and when a magnitude of the exerted external force is in excess of the tolerance, the exposure surface of the outer circumference is brought into contact with the opposing surface of the displacement control portion, thereby controlling displacement of the annular detector.

3. The force sensor according to claim 2, wherein
the annular detector is constituted with a first cylindrical structural body, the external protrusion portion is constituted with a second cylindrical structural body in which an outer circumferential surface of the first cylindrical structural body is given as an inner circumferential surface, and the displacement control portion is constituted with a third cylindrical structural body which has an upper surface opposing a lower surface of the second cylindrical structural body, and
in a state that no external force is exerted, each of the cylindrical structural bodies is disposed in such a manner that any one of a central axis of the first cylindrical structural body, a central axis of the second cylindrical structural body and a central axis of the third cylindrical structural body is given as a same axis orthogonal to the upper surface of the supporting substrate.

4. The force sensor according to claim 3, wherein
the columnar body is constituted with a columnar structural body which has a same central axis as the central axis of each of the cylindrical structural bodies, and
the flexible connection member is constituted with an annular plate-shaped body in which an inner circumferential part thereof is connected to an outer circumferential surface of the columnar body and an outer circumferential part thereof is connected to an inner circumferential surface of the annular detector.

5. The force sensor according to claim 2, wherein
the annular detector is constituted with a first polygonal tubular structural body, the external protrusion portion is constituted with a second polygonal tubular structural body in which an outer circumferential surface of the first polygonal tubular structural body is given as an inner circumferential surface thereof, the displacement control portion is constituted with a third polygonal tubular structural body which has an upper surface opposing a lower surface of the second polygonal tubular structural body, and
in a state that no external force is exerted, each of the polygonal tubular structural bodies is disposed in such a manner that any one of a central axis of the first polygonal tubular structural body, a central axis of the second polygonal tubular structural body and a central axis of the third polygonal tubular structural body is given as a same axis orthogonal to the upper surface of the supporting substrate.

6. The force sensor according to claim 1, wherein the columnar body, the flexible connection member, the annular detector and the external protrusion portion are given as an upper structural body which is composed of an integrated structural body made of a same material.

7. The force sensor according to claim 1, wherein the supporting substrate and the displacement control portion are given as a lower structural body which is composed of an integrated structural body made of a same material.

8. The force sensor according to claim 1, wherein
a hole portion for attachment for attaching a first object disposed above is formed at the external protrusion portion,
a hole portion for attachment for attaching a second object disposed below is formed at a position where a displacement control portion of the supporting substrate is disposed,
a hole portion for attachment for attaching the columnar body is formed at a position in contact with the columnar body of the supporting substrate, and a hole portion for attachment is formed at a corresponding position of the columnar body,
screws or bolts which have been inserted into the hole portions for attachment are used to connect the external protrusion portion with the first object, connecting the supporting substrate with the second object, and connecting the supporting substrate with the columnar body, and
in a state that one of the first object and the second object is fixed, an external force exerted on the other can be detected.

9. The force sensor according to claim 1, wherein
tolerance of a magnitude of an external force is set within a range where the flexible connection member undergoes elastic deformation by exertion of the external force, and displacement of the annular detector is suppressed within the tolerance by the displacement control portion, thereby causing the flexible connection member to deform within a range of elastic deformation.

10. The force sensor according to claim 1, wherein a sealing member made of an elastic deformation material is filled into the vertical clearance or the lateral clearance(Sr), thereby sealing off from an outside a space at which the detection elements are disposed.

11. The force sensor according to claim 1, wherein
an insulation substrate(300) having an opening portion for inserting the columnar body at a central part is fixed on the upper surface of the supporting substrate to form the fixed electrodes on an upper surface of the insulation substrate, and
the annular detector is constituted with a conductive material and a lower layer part of the annular detector is used as a displacement electrode.

12. The force sensor according to claim 11, wherein
a circuit component which constitutes a detection circuit is disposed on the insulation substrate, and the columnar body, the flexible connection member and the annular detector which are made of a conductive material are used as a part of wiring between the circuit component and the displacement electrode.

13. The force sensor according to claim 12, wherein
when an XYZ three-dimensional orthogonal coordinate system is defined in such a manner that an origin O is taken at a central position of the upper surface of the supporting substrate, an XY plane is taken at the upper surface of the supporting substrate and a central axis of the columnar body is in alignment with a Z axis,
there are formed on the upper surface of the insulation substrate a first fixed electrode disposed at a positive region of an X axis, a second fixed electrode disposed at a negative region of the X axis, a third fixed electrode disposed at a positive region of a Y axis, a fourth fixed electrode disposed at a negative region of the Y axis and a fifth fixed electrode disposed annularly so as to surround a periphery of the Z axis, and these individual fixed electrodes and opposing parts of a common displacement electrode composed of the lower layer part of the annular detector constitute a first capacitive element, a second capacitive element, a third capacitive element, a fourth capacitive element and a fifth capacitive element.

14. The force sensor according to claim 13, wherein
the detection circuit detects a moment component My of exerted external force around the Y axis on the basis of a difference between a capacitance value of the first capacitive element and a capacitance value of the second capacitive element, detects a moment component Mx of the exerted external force around the X axis on the basis of a difference between a capacitance value of the third capacitive element and a capacitance value of the fourth capacitive element and detects a component of the exerted external force in a direction of the Z axis on the basis of a capacitance value of the fifth capacitive element.

\* \* \* \* \*